June 14, 1960   W. C. EAVES   2,940,773
SPLASH GUARD

Filed May 24, 1955   3 Sheets-Sheet 1

INVENTOR.
WILLIAM C. EAVES
BY
Harry O. Ernsburgh
ATTY.

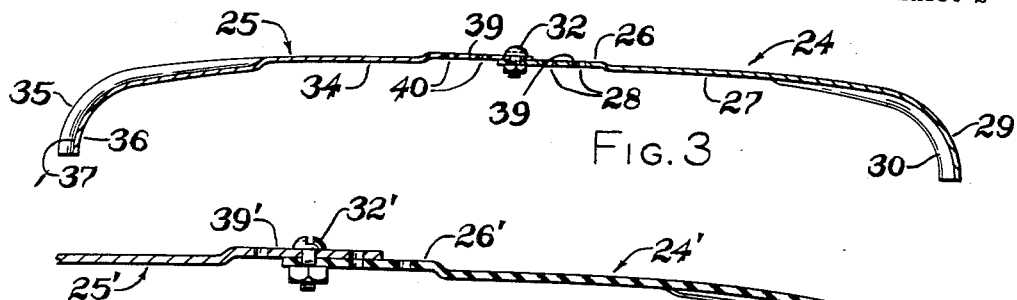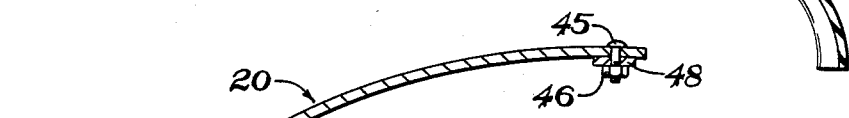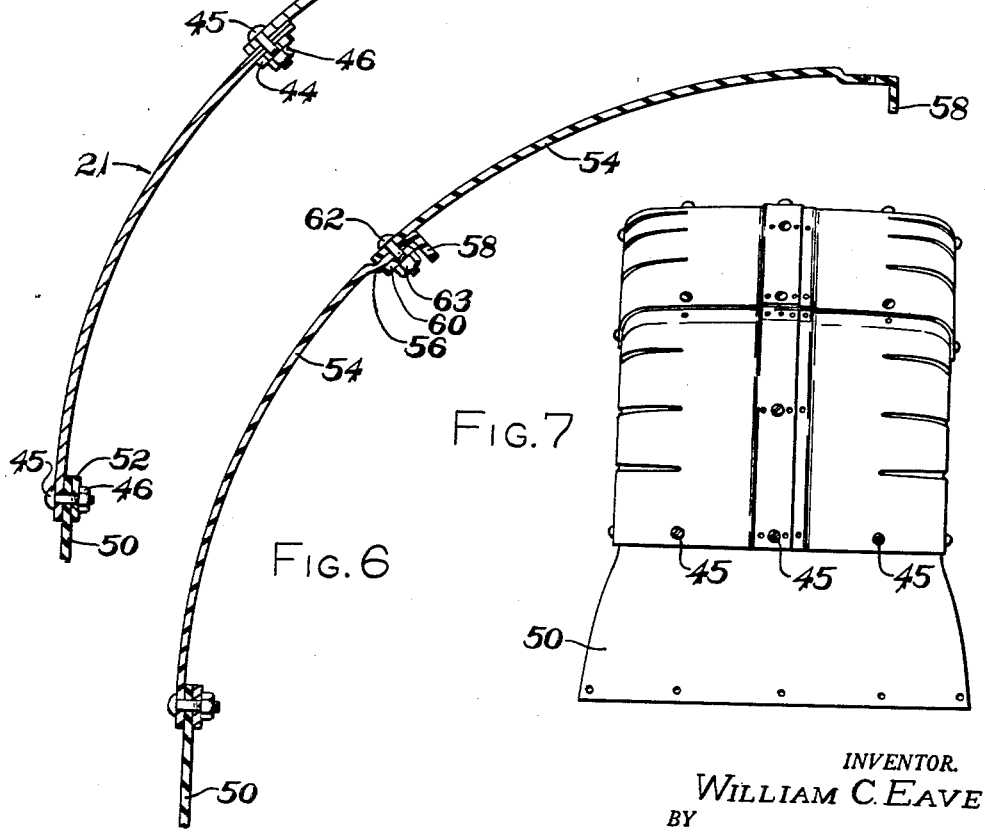

June 14, 1960     W. C. EAVES     2,940,773
SPLASH GUARD
Filed May 24, 1955     3 Sheets-Sheet 3
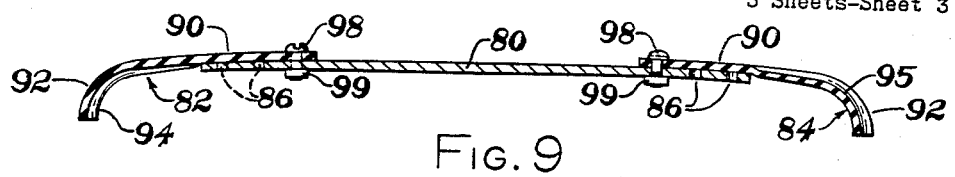
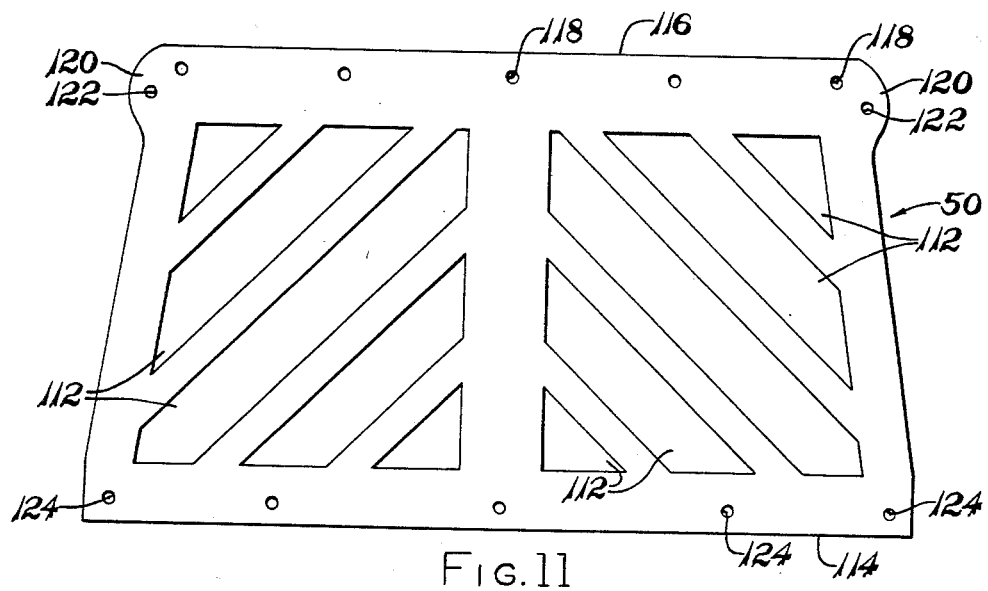
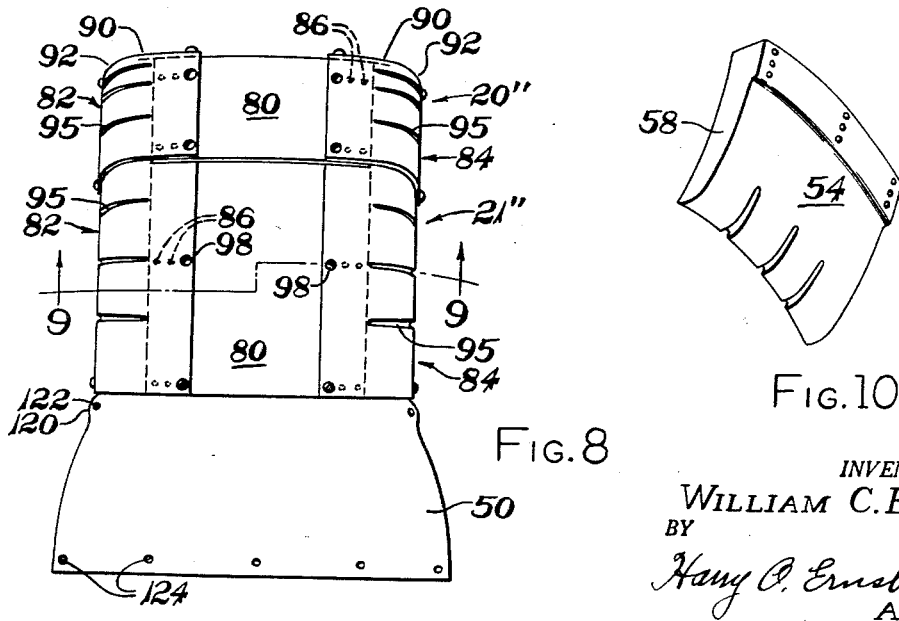
INVENTOR.
WILLIAM C. EAVES
BY
Harry O. Ernsberger
ATTY.

United States Patent Office 2,940,773
Patented June 14, 1960

2,940,773

SPLASH GUARD

William Cadby Eaves, 11720 Edgewater Drive, Lakewood, Ohio

Filed May 24, 1955, Ser. No. 510,626

1 Claim. (Cl. 280—154.5)

This invention relates to splash guards or fender shields for vehicles and more especially to splash guards for use with trucks, trailers, tractor-trailer vehicles and the like.

It has been conventional practice to provide flaps or guards adjacent the rear wheels of truck-type vehicles, the flaps being fabricated of sheets of heavy rubber which depend from the vehicle frame. Flaps or guards of this character have been unsatisfactory in effectively preventing rearward and transverse projection of stones, water and other foreign matter thrown from the tires. The flaps are suspended for free swinging movements and at high speeds tend to sail toward horizontal positions hence are only partially effective to prevent rearward traverse of foreign matter thrown from the tires. Such flaps are readily subject to being torn when the vehicle is backed into loading docks, curbs and the like due to the flaps being pinched between the tires and the loading dock or curb thus requiring replacement. Such flaps do not embrace or conform to any circumferential zone near the periphery of the tires and hence are ineffective for interrupting laterally directed water or stones. The flaps act as baffles and actually deflect stones laterally into the path of passing vehicles and, in severe rainstorms, they intercept water thrown from the tires and spread the water in the form of a mist or cloud obscuring the vision of operators of passing vehicles.

The present invention embraces the provision of a fender unit or splash guard construction particularly for use on vehicles of the truck or trailer type for effectively intercepting and deflecting downwardly water, loose stones and other foreign matter thrown from the tires of the vehicle wheels.

An object of the invention resides in the provision of a splash guard construction of multisectional character formed of elements or sections which are adjustable to accommodate the construction to wheel-and-tire assemblies of different sizes.

Another object of the invention is the provision of a splash guard or fender unit especially for truck-type vehicles which will withstand the impact and buffeting of flying stones and other loose objects which may be thrown from the vehicle tires and resist the corrosive effect of salt water, tars and the like.

Another object of the invention is the provision of a splash guard or fender section or unit for a truck-type vehicle wherein the guard or section is fabricated in a manner providing a degree of flexibility whereby the guard or section may yield under impact but will return to its initial shape or configuration.

Another object of the invention is the provision of a splash guard or fender section especially for use with trucks embodying dual-wheel constructions or units wherein the guard or fender section is formed of components or elements adapted to be assembled in various relative positions to vary the overall width of the guard or fender section.

A further object of the invention resides in a splash guard or fender construction formed of a plurality of components which are adapted to be manufactured with a minimum of tooling expense, the splash guard or fender section components being readily interchangeable to facilitate repair or replacement.

A further object of the invention resides in a method of forming components or elements of a splash guard or fender section whereby the components may be nested to form a compact package to facilitate storage and shipping of the splash guard or fender section units in disassembled condition.

Still a further object of the invention is the provision of a splash guard or fender section for use with tire-and-wheel constructions of trucks wherein the effective length of the guard or section may be varied by utilizing a number of component elements making up the guard to provide the desired length therefor.

Still a further object of the invention is the provision of a splash guard for truck-type vehicles in which the components or elements may be made of sheet metal, molded rubber, synthetic rubber or plastic to provide a construction which is capable of long life and which will withstand rough usage.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 3 is a transverse sectional view taken substantially on the line 3—3 of Figure 2;

Figure 4 is a fragmentary sectional view illustrating a modification of the splash guard construction;

Figure 5 is a longitudinal sectional view taken substantially on the line 5—5 of Figure 2;

Figure 6 is a view similar to Figure 5 illustrating another form of the invention;

Figure 7 is a rear elevational view of a form of the invention illustrating a transverse adjustment of the fender or splash guard sections;

Figure 8 is a view similar to Figure 7 illustrating a modified form of the invention;

Figure 9 is a transverse sectional view taken substantially on the line 9—9 of Figure 8;

Figure 10 is an isometric view of one of the elements of the splash guard construction, and Figure 11 is an elevational view of a form of flexible extension or flap forming a part of the construction.

While the invention is illustrated as associated with the rear wheels of a truck-type vehicle, it is to be understood that the splash guard or fender construction may be utilized with other types of vehicles having multiple sets of wheels or with any type of vehicle construction wherein the invention may be found to have utility.

Figure 1:
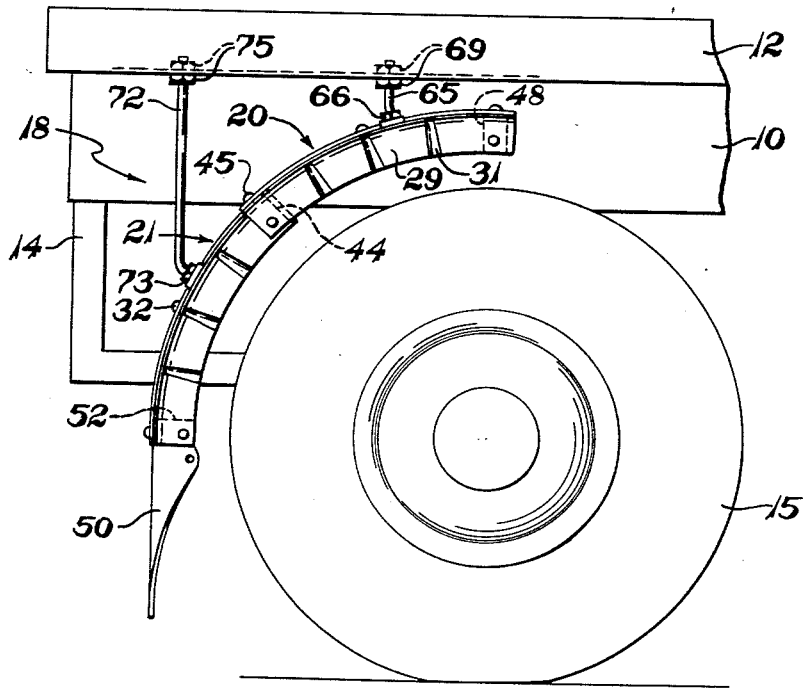
Figure 1 is a side elevational view of the rear portion of a truck-type vehicle equipped with dual wheels, illustrating a form of the invention associated therewith.
Figure 2:
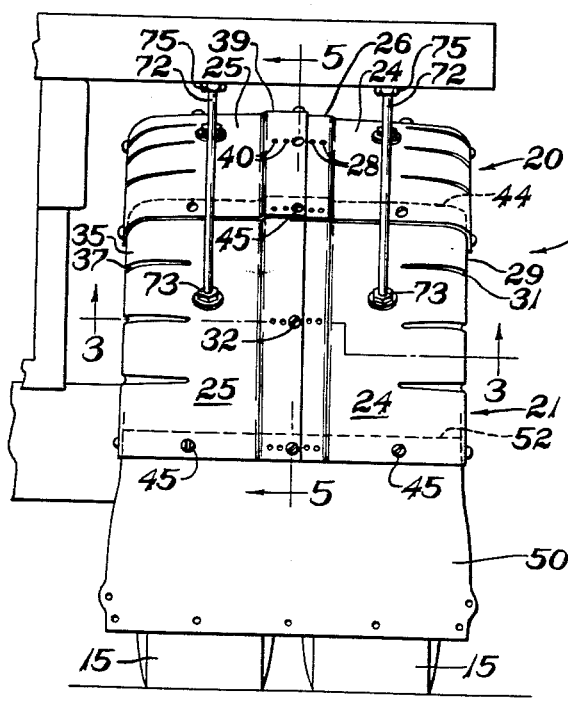
Figure 2 is a rear elevational view of the construction illustrated in Figure 1.

Referring initially to Figures 1 and 2, there is illustrated the rear portion of a frame 10 of a heavy-duty truck-type vehicle supporting a platform, bed or body construction 12. The frame is provided with depending portions 14 to which conventional springs and axles (not shown) are secured. In the illustrated embodiment the vehicle is equipped with dual wheels 15, one set being shown in Figures 1 and 2.

Associated with each set of dual wheels is a fender or splash guard construction 18 disposed in a position rearwardly of the wheels 15 to intercept water, stones or other foreign matter that may be discharged from the peripheries of the wheels 15 during forward travel of the vehicle. The form of invention illustrated in Figure 1 is inclusive of fender or splash guard sections 20 and 21, each section including elements or components 24 and 25. Each of the components or half sections 24 in the form shown in Figures 1 through 3 is fashioned of sheet metal having a body portion 27 of slight transverse curvature or convexity as shown in Figure 3. The longitudinal curvature of each component is fashed to be disposed generally concentric with the periphery of the tires of the wheels 15.

The body portion 27 is formed at one edge zone with a curved or arcuate configuration 29. In forming the arcuate portion 29, the metal is formed to provide a series of inwardly extending ridges 30 forming recesses 31 on the exterior of the curved zone 29. The formation of the ridges 30 makes possible the fashioning of the edge zone into a curved configuration and also forms a reinforcement providing rigidity for the section. The inner edge zone of body portion 27 is preferably formed with a raised portion or land 26 provided with groups of openings 28, there being three openings in each group.

Each of the components or half sections 25 is formed with a body portion 34 having its outer edge zone 35 of curved configuration similar to the curved configuration 29 on the components 24. The curved portion of the component is formed with inwardly extending ridges 36 which provide exterior recesses 37 of the same configuration as the ridges 30 and recesses 31 on the components or elements 24.

Each of the sections 25 is integrally formed with a longitudinally extending, raised portion or land 39, preferably provided with sets of openings 40 as shown in Figures 2 and 3. In the embodiment shown in Figures 1 through 3, there are three openings in each group or set of openings in the raised portions or lands 26 and 39. The groups of openings in the land 39 are transversely aligned with the groups of openings 28 in the land 26 of the body portion 27 of the adjacent component 24.

Through the provision of the sets or groups of openings in the components 24 and 25, the components or elements 24 and 25 may be adjusted to three different positions, providing three different overall widths for the fender sections to readily accommodate tire-and-wheel constructions of different sizes. As shown in Figures 2 and 3, components 24 and 25 are illustrated as assembled in the position of greatest width, being held together by bolts 32. By removing the securing bolts 32, the components or half sections 24 and 25 may be moved or adjusted to render another row of openings of the sets of openings in half section 25 in registration with correspondingly positioned openings in section 24 to reduce the effective width of the assembly of half sections. Such an intermediate adjustment of width is illustrated in Figure 7 wherein the securing bolts extend through the intermediate openings of each set. Through the arrangement illustrated in Figures 2 and 3, the components or half sections may be assembled into three positions, providing three different widths for an assembled section. It is to be understood that while each group is inclusive of three openings in the illustrated embodiment, a lesser or greater number of openings may be provided in each element or half section, dependent upon the number of adjustments for width desired in the construction.

Each of the sections 20 and 21 is made up of half sections, elements or components 24 and 25. The adjacent end zones of sections 20 and 21 overlap as shown in Figures 1, 2 and 5. At the zone of the overlap, there is preferably provided a reinforcing strip 44, the overlapping zones of the sections 24 and 25 and the reinforcing strip 44 being formed with registering openings adapted to receive securing bolts 45 held in place by nuts 46. The reinforcing strip 44 is preferably disposed interiorly of the sections as shown in Figure 5 and is formed with groups of openings to accommodate bolts 45 in the several positions of adjustment of the half sections or components 24 and 25. The reinforcing strip 44 terminates short of the curved edge zones 29 and 35 of sections 20 and 21, respectively, so as to facilitate relative adjustment of the half sections or components. A reinforcing strip 48, similar to strip 44, may be provided at the leading edge zone of section 20 and is held in place by securing bolts 45 held in place by nuts 46.

Secured to the rear or trailing edge zone of section 21 is a member or flap formed of flexible material such as rubber, synthetic rubber or moldable plastic which depends from the section 21 in the manner illustrated in Figures 1, 2 and 5. The flap 50 is provided with openings registering with openings formed in the trailing edge zone of the section 21 and a reinforcing strip 52. The registering openings are adapted to receive securing bolts 45 provided with nuts 46 for securing these elements in assembled relation as shown in Figure 5.

It will be noted that the reinforcing strips 44, 48 and 52 are illustrated as disposed interiorly of the fender or splash guard sections, but it is to be understood that the reinforcing strips may be disposed exteriorly of the sections if desired.

Figure 4 illustrates a fender section construction which is similar to that illustrated in Figures 1 through 3. In the form shown in Figure 4, the half section or component 24' is molded of rubber, plastic or similar yieldable material and the adjacent half section or component 25' is formed of metal and is of the shape illustrated in Figures 1 through 3. The half section 24' of flexible material is formed with a land 26' and the metal half section 25' is formed with a land 39'. The lands 26' and 39' are provided respectively with groups of openings of the same character as are provided in half sections 24 and 25 described hereinbefore. The half sections 24' and 25' may be held in adjusted position by means of securing bolts 32'. The components or half sections 24' and 25' are adjustable to provide different widths in the same manner as the components or half sections of the construction illustrated in Figures 1 through 3. It is to be understood that both components or half sections 24' and 25' may be formed or molded of rubber, plastic or other similar material.

Figures 6 and 10 illustrate a modified form of yieldable half section of the character shown in Figure 4. The half section 54 is formed at its leading edge zone with a depending portion or flange 58. The overlapping zones of the yieldable half sections 54 are provided with openings which register with openings in a reinforcing metal strip 60, the openings receiving securing bolts 62 provided with nuts 63. In this form of component or half section of the splash guard, the depressed or recessed portion 56 accommodates the end zone of the adjacent half section and provides a symmetrical contour for the exterior surfaces. The inwardly extending flanges 58 interrupt flying stones or other particles and deflect or redirect them downwardly toward the roadway and also serve as transverse reinforcement for the guard. While Figure 6 is illustrative of half sections formed of rubber or flexible material, it is to be understood that the adjacent components or half sections may be formed of rubber or flexible material or they may be formed of sheet metal of substantially the same configuration as the half sections 54.

Figure 7 illustrates a fender section wherein the half sections are adjusted to an intermediate position, providing an intermediate width for the fender construction. The flexible member 50, hereinafter described in detail, is arranged to accommodate transverse adjustments of the half sections.

A means of attaching or securing the fender constructions to the frame or bed construction of the truck is illustrated in Figures 1 and 2. Each of the half sections or components of the section 20 is formed with an opening to receive the threaded extremity of a rod or supporting member 65 which may be secured to the half section by means of nuts disposed exteriorly and interiorly of the fender half section, one of the securing nuts being shown at 66. The upper end of each of the rods 65 is threaded and extends through an opening in the portion 12 of the truck and is arranged to receive threaded nuts 69 which may be manipulated to secure the proper vertical positioning or adjustment of the fender section 20.

The adjacent fender section 21 is suspended from the portion 12 of the truck by a pair of rods 72 in substantially the same manner as section 20. Each rod or support 72 has its lower end disposed normal to the section and threaded to receive securing nuts 73 disposed interiorly and exteriorly of the fender section. The rods 72 are of increased length as compared with rods 65 and the upper ends of rods 72 are threaded to receive pairs of adjusting nuts 75 to adjust the fender section 21 to the proper position relative to section 20 and the vehicle frame. The fender or splash guard sections 20 and 21 should be adjusted through manipulation of the nuts 69 and 75 on rods or supports 65 and 72 to bring the fender sections into a position substantially concentric with the periphery of the vehicle tires 15 as shown in Figure 1.

Figures 8 and 9 illustrate a modified form of fender or splash guard. In the form shown in Figures 8 and 9, each of the fender sections 20″ and 21″ is composed of three major components, a central panel or body component 80 preferably formed of sheet metal and transversely disposed components 82 and 84 which are preferably formed or molded of rubber, resinous material or other yieldable material. Each of the metallic central sections 80 is formed at its transverse edge zones with groups of openings 86, there being three openings shown in each transverse group at an edge zone of the central section 80.

The rubber components 82 and 84 may be of identical construction, each being formed with a body portion 90 terminating at one longitudinal edge zone in a downwardly curved configuration 92, the opposite edge zone being formed with openings to receive means for securing the rubber section to the central section. The curved zones 92 of the rubber sections 82 and 84 are of accordion shape formed by means of ridges 94 which extend inwardly providing recesses 95 exteriorly of the rubber components. The material defining the recesses may be of lesser thickness to provide greater flexibility.

These ridges or recesses are integrally molded in the rubber sections and provide a substantial degree of rigidity for maintaining the rubber members or elements in their initial shapes and still allow for flexure under impact. The rubber elements 82 and 84 are secured to the central metal section or member 80 through the medium of securing bolts 98 and cooperating nuts 99. It should be noted from Figures 8 and 9 that the rubber elements and central metal section are capable of adjustment to provide five different widths for the fender or splash guard construction. These adjustments may be had through the positioning of the proper row of openings in each transversely disposed group of openings with respect to the openings in the rubber sections whereby the securing bolts 98 may be inserted therein. Five different widths of splash guard construction may be had where six transverse openings are provided in each group in the central section 80.

When the components of the fender section or unit are fabricated of sheet metal, such metals as steel, aluminum, magnesium alloys or similar sheet metals may be used for the purpose. When one or more of the sections or components of the sections are formed of non-metallic materials, such materials as rubber, synthetic rubbers such as butadiene acrylonitrile, butadiene styrene or similar compositions may be utilized. Various resins or plastics such as polystyrene, polyethylene or the like which are of moldable character may also be utilized.

Figure 11 is illustrative of a form of flap or extension 50 adapted to be secured to and depend from the rearmost fender guard or section of the splash guard unit. The flap or member 50 may be made of any suitable resilient or flexible material such as rubber, synthetic rubber, flexible plastic or resinous material. The form of flap shown in Figure 11 is especially configurated or shaped to fit or be attached to fender section assemblies of different widths.

As shown in Figure 11, the central zones of the flap 50 may be embossed with ridges 112 or other configuration to provide a finished appearance for the flap construction and impart a limited degree of rigidity thereto. The flap 50 is of greater width at its lower zone 114 than at the uppermost zone 116 as viewed in Figure 11, providing a generally trapezoidal configuration or shape. The upper zone 116 is provided with openings 118 adapted to receive bolts 45 as shown in Figures 5 and 7 or bolts 98 as shown in Figures 8 and 9. As shown in Figure 8, the fender section is assembled at its narrowest width.

The flap construction 50 is formed at its upper, lateral edges with projecting portions or tabs 120, each tab being provided with an opening 122. When the fender sections are adjusted to an intermediate width, the securing bolts for attaching the flap to the fender section may be inserted through the openings 122 to accommodate the intermediate width of the splash guard or fender section. Additional openings (not shown) aligned transversely with openings 122 may be provided to receive bolts for securing intermediate zones of the flap to the fender section.

The zone 114 of greatest width of the flap 50 is formed with openings 124 adapted to receive bolts for securing the flap to a fender section when the latter is adjusted to its greatest width. In assembling flap 50 to fender sections adjusted to their extreme widths, the flap is inverted from the position shown in Figure 11 whereby the zone 114 is secured to the fender section by bolts 45, the assembly of the flap in this position being shown in Figure 2.

From examination of Figure 2, it will be noted that the upper zone of the flap appears to be narrower than the lower zone, but this appearance is due to the fact that the edge zones of the flap are curved to coincide with the curved edge zones of the fender section. A reinforcing strip 52 of metal or other suitable material may be utilized, if desired, as shown in Figure 2 and is provided with openings to receive the securing bolts for attaching the flap 50 to the rearmost fender section.

Through the utilization of an extension or flap of the character and configuration shown in Figure 10, a single size of flap may be assembled with fender section constructions adjusted to different widths.

It will be apparent from the foregoing that the splash guard or fender construction of the invention is fabricated of few parts or components, the components or elements of the fender sections being of two types: right and left; and any number of the sections 20, 21 may be assembled to provide fender or splash guard units of different lengths, dependent upon the circumferential distance of the vehicle tire to be embraced or subtended by the splash guard. Furthermore, through the fabrication of the components or half sections in the manner illustrated and described, the half sections or components in unassembled condition may be readily nested to form a compact package for shipping or storage purposes. As the right and left components, parts or elements making up a fender unit or section are fashioned to be rendered adjustable in a transverse direction, fender units of various widths may be formed by adjusting the overlapping zones of the components to the desired extent and affixing bolts or other securing means to the assembled components to fasten them together. The depending sections or flanges 58 formed on the fender sections in the type molded from rubber, plastic or other like material, provide a transverse reinforcement, assisting in maintaining the fender sections in their initial shape. This projection on the foremost fender section of the unit presents a finished appearance. The projections function as baffles or abutments to intercept stones or other articles that may be thrown outwardly from the tread of the vehicle tires and redirect them towards the roadway.

The fluting or corrugated configuration in the side zones of the fender components provides a rigid construction and on those components formed of metal, provides a means of avoiding wrinkles in fashioning or drawing the metal to the curved configuration. In those forms of fender half sections or components molded of rubber or flexible plastic, the fluted configuration at the edge zones provides an added factor of flexibility, enabling the fender sections to be temporarily distorted as by impact of stones thrown from the vehicle tires and return or spring back to their initial positions. This factor greatly prolongs the life of the components of the fender sections molded of rubber, synthetic rubber or plastic.

It is apparent that, within the scope of the invention, modifications and different arrangements may be made other than is herein disclosed, and the present disclosure is illustrative merely, the invention comprehending all variations thereof.

I claim:

A splash guard construction for a truck-type vehicle, in combination, a plurality of fender sections disposed in longitudinally aligned relation and being curved in the direction of their length, means for securing adjacent portions of said sections together, each of said sections comprising a central component and a component disposed at each side of the central component, said side components being transversely adjustable relative to the central component for varying the width of the fender section, means for securing the side components to the central component in adjusted positions, and a flap of flexible material secured to the end zone of one of the fender sections, said central component being formed of metal, said side components being formed of flexible material, each of said side components being formed with an inwardly directed curved flange, said flap having end zones of different widths and being reversible to accommodate fender sections of different widths.

References Cited in the file of this patent

UNITED STATES PATENTS

| | | |
|---|---|---|
| 923,849 | Jones | June 8, 1909 |
| 1,178,337 | Newton | Apr. 4, 1916 |
| 1,716,300 | Broadwell | June 4, 1929 |
| 2,091,910 | Cohen | Aug. 31, 1937 |
| 2,617,662 | Jackson | Nov. 11, 1952 |
| 2,679,403 | Howard et al. | May 25, 1954 |

FOREIGN PATENTS

| | | |
|---|---|---|
| 479,622 | Great Britain | Feb. 9, 1938 |
| 321,968 | Italy | Oct. 23, 1934 |
| 156,289 | Switzerland | Oct. 1, 1932 |